(12) United States Patent
Lee (10) Patent No.: US 10,330,495 B2
(45) Date of Patent: Jun. 25, 2019

(54) DEVICE FOR MEASURING ROTATIONAL SPEED

(71) Applicant: Ching-Feng Lee, Chiayi (TW)

(72) Inventor: Ching-Feng Lee, Chiayi (TW)

(73) Assignee: Ching-Feng Lee, Chia-Yi (TW)

( * ) Notice: Subject to any disclaimer, the term of this patent is extended or adjusted under 35 U.S.C. 154(b) by 0 days.

(21) Appl. No.: 16/143,441

(22) Filed: Sep. 26, 2018

(65) Prior Publication Data

US 2019/0025079 A1 Jan. 24, 2019

(51) Int. Cl.
*G01D 5/04* (2006.01)
*G06M 9/02* (2006.01)

(52) U.S. Cl.
CPC .............. *G01D 5/04* (2013.01); *G06M 9/025* (2013.01)

(58) Field of Classification Search
USPC ........................................................ 235/103
See application file for complete search history.

(56) References Cited

U.S. PATENT DOCUMENTS

2012/0111323 A1* 5/2012 Bacon ............... A61M 15/0065
128/203.12

* cited by examiner

*Primary Examiner* — Rafferty D Kelly (57) ABSTRACT

A device for measuring rotational speed includes a housing comprising a base including vertical first and second end walls, and a cover including a window; a lower drive mechanism including a shaft including a gear adjacent to an inner surface of the first end wall, and gear elements rotatable around the shaft in a suspended manner, each gear element including first teeth and second teeth alternated with the first teeth; and an upper counter assembly including a reset shaft including a wing handle and a groove; a gear member rotatable around the reset shaft in a suspended manner and meshed with the gear, the gear member including a projection; and a first number wheel and second number wheels arranged from the gear member to the second end wall sequentially on the reset shaft. Each of the first and second number wheels is a ratchet type device.

5 Claims, 12 Drawing Sheets

DEVICE FOR MEASURING ROTATIONAL SPEED

BACKGROUND OF THE INVENTION

1. Field of the Invention

The invention relates to rotational speed measurement and more particularly to a device for measuring rotational speed.

2. Description of Related Art

Conventional devices for measuring rotational speed are disadvantageous due to low precision and incorrect reset after use. Thus, the need for improvement still exists.

SUMMARY OF THE INVENTION

It is therefore one object of the invention to provide a device for measuring rotational speed comprising a housing comprising a base including vertical first and second end walls, and a space defined by a horizontal portion of the base and the first and second end walls, and a cover releasably secured onto the base and including a window; a drive mechanism disposed through the first and second end walls and on a lower portion of the space, the drive mechanism comprising a rotatable shaft having one end through the second end wall, and other end through the first end wall to dispose in a sleeve on an outer surface of the first end wall, the shaft including a gear adjacent to an inner surface of the first end wall, and a plurality of equally spaced gear elements between the first end wall and the gear, the gear elements being rotatable around the shaft in a suspended manner, each gear element including a plurality of equally spaced first teeth and a plurality of equally spaced second teeth alternated with the first teeth; and a counter assembly disposed through the first and second end walls and on an upper portion of the space, the counter assembly comprising a rotatable reset shaft having one end through the second end wall, and other end through the first end wall to form a wing handle on an outer surface of the first end wall, the reset shaft including a lengthwise, elongated groove; a gear member configured to rotate around the reset shaft in a suspended manner and meshed with the gear, the gear member including a projection wherein size and number of teeth of the gear member are the same as that of the gear; and a first number wheel and a plurality of second number wheels arranged from the gear member to the second end wall sequentially on the reset shaft, the first and second number wheels being rotatable around the reset shaft in a suspended manner; wherein the first number wheel includes a toothed section meshed with the first teeth, an internal first space, a plurality of equally spaced troughs on an edge of the first space, a first pawl, a first elastic member urging against the first pawl, two spring-loaded first arms disposed in the first trough and urging against inside of the first number wheel, and a ring shaped first cover including a first cavity with the projection disposed therein; each second number wheel includes a toothed cover meshed with the second teeth, an internal second space, a plurality of equally spaced second troughs on an edge of the second space, a second pawl, a second elastic member urging against the second pawl, and two spring-loaded second arms disposed in the second trough and urging against inside of the second number wheel; the second number wheels are partially visible through the window; and each of the first and second pawls clear the lengthwise, elongated groove.

The above and other objects, features and advantages of the invention will become apparent from the following detailed description taken with the accompanying drawings.

DETAILED DESCRIPTION OF THE INVENTION

Referring to FIGS. 1 to 19, a device for measuring rotational speed in accordance with the invention comprises the following components as discussed in detail below.

A housing 1 includes a base 11 having vertical first and second end walls 111, 112, and a space 113 defined by a horizontal portion of the base 11 and the first and second end walls 111, 112, and a cover 12 releasably secured onto the base 11. A drive mechanism 2 is disposed through the first and second end walls 111 and 112 and on a lower portion of the space 113. The drive mechanism 2 includes a rotatable shaft 21 having one end through the second end wall 112, and the other end through the first end wall 111 to dispose in a sleeve 22 on an outer surface of the first end wall 111. The shaft 21 includes a gear 211 adjacent to an inner surface of the first end wall 111, and a plurality of equally spaced gear elements 212 between the first end wall 111 and the gear 211. The gear elements 212 are adapted to rotate around the shaft 21 in a suspended manner, i.e., the rotations of the shaft 21 and the gear elements 212 being independent. The gear element 212 comprises a plurality of equally spaced first teeth 2121 and a plurality of equally spaced second teeth 2122 alternated with the first teeth 2121.

A counter assembly 3 is disposed through the first and second end walls 111 and 112 and on an upper portion of the space 113 and comprises a rotatable reset shaft 31 having one end through the second end wall 112, and the other end through the first end wall 111 to form a wing handle 35 on an outer surface of the first end wall 111. The reset shaft 31 includes a lengthwise, elongated groove 311. The counter assembly 3 further comprises a washer 36 put on the reset shaft 31 and engaged with an inner surface of the first end wall 111, and a gear member 32 engaged with the washer 36. The gear member 32 is adapted to rotate around the reset shaft 31 in a suspended manner, i.e., the rotations of the reset shaft 31 and the gear member 32 being independent. The gear member 32 includes a plurality of teeth 321 on one surface and in meshing engagement with the teeth of the gear 211, and a bossed hole 32 on the other surface. The gear member 32 and the gear 211 are of the same size and have the same number of teeth.

The counter assembly 3 further comprises a first number wheel 33 and five second number wheels 34 arranged from the gear member 32 to the second end wall 112 sequentially on the reset shaft 31. The first and second number wheels 33, 34 are adapted to rotate around the reset shaft 31 in a suspended manner, i.e., the rotations of the reset shaft 31 and the first and second number wheels 33, 34 being independent.

Figure 9:
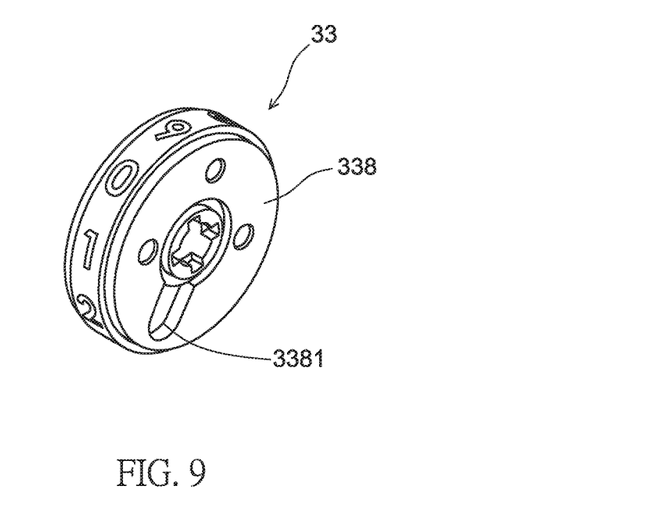
FIG. 9 is a perspective view of the first number wheel.
Figure 10:
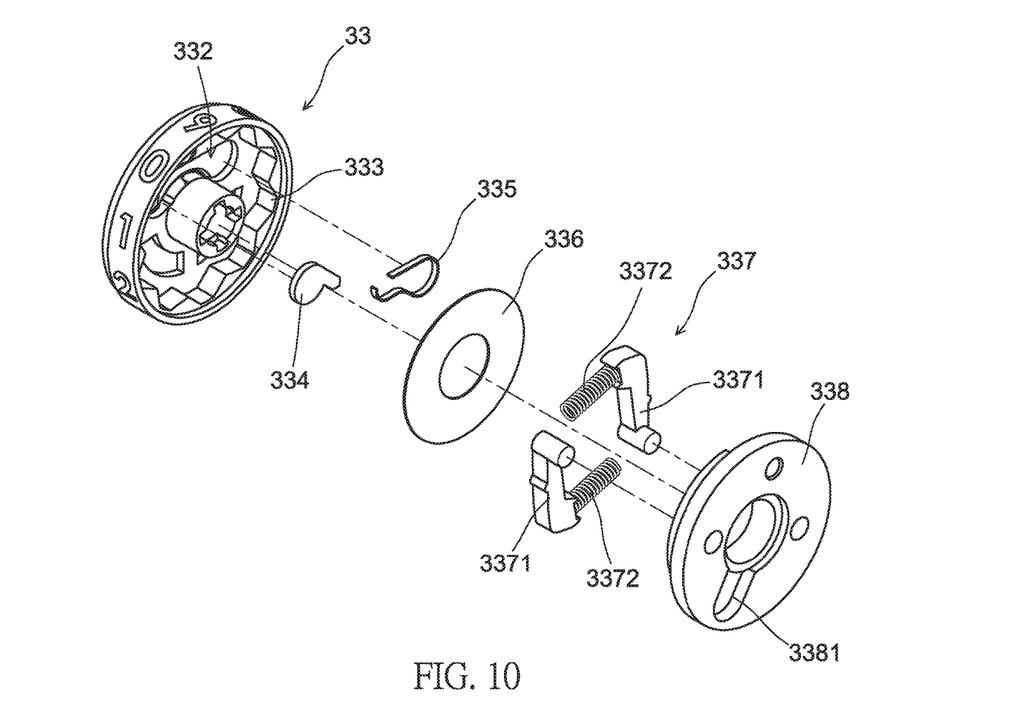
FIG. 10 is an exploded view of the first number wheel.
Figure 11:
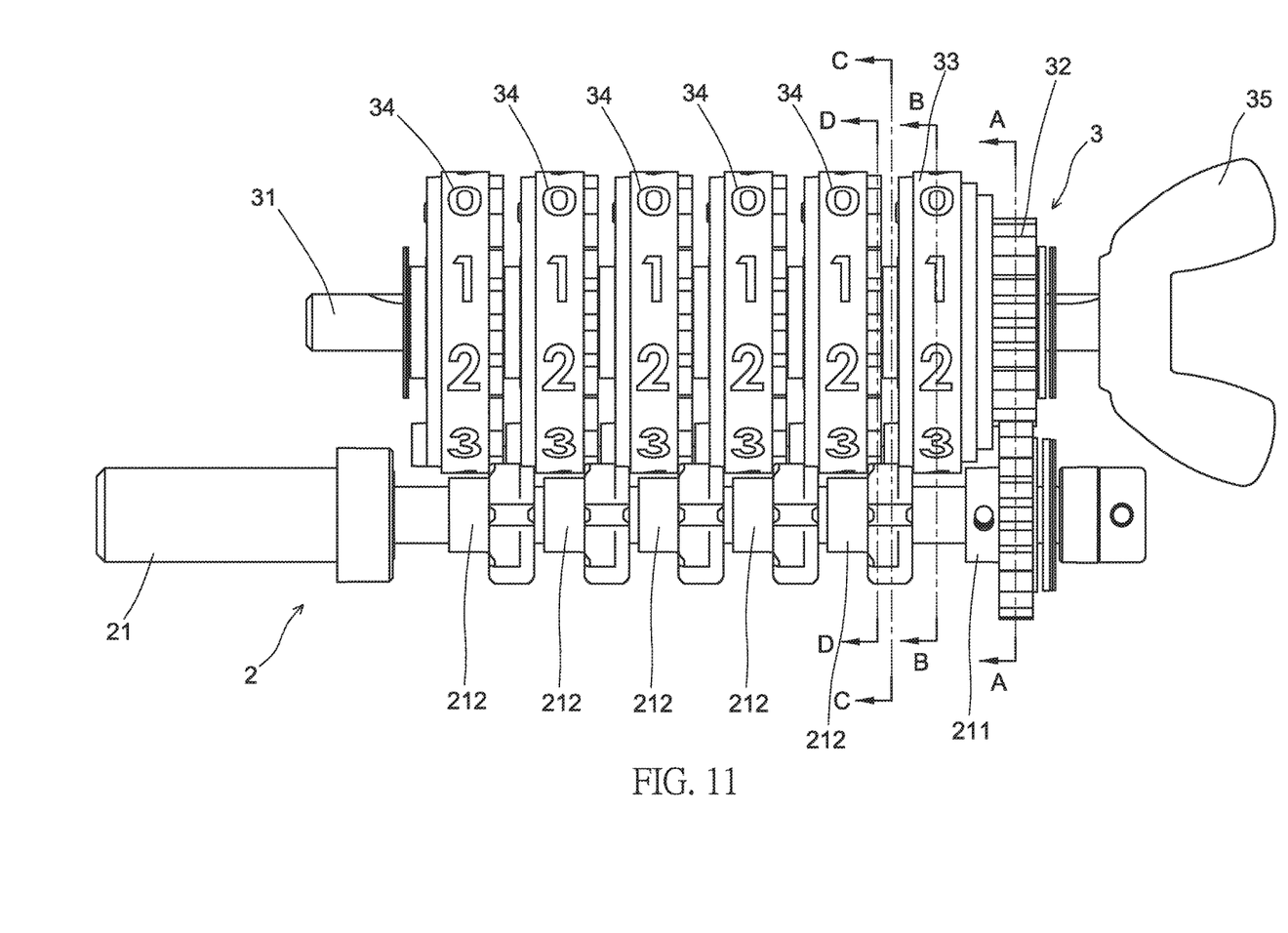
FIG. 11 is a side elevation of FIG. 3 with the base removed.
Figure 12:
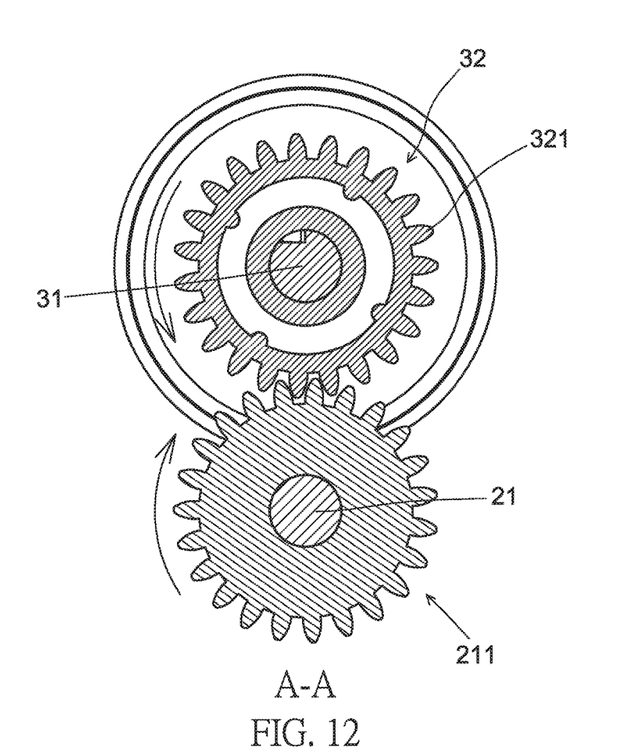
FIG. 12 is a sectional view taken along line A-A of FIG. 11.
Figure 13:
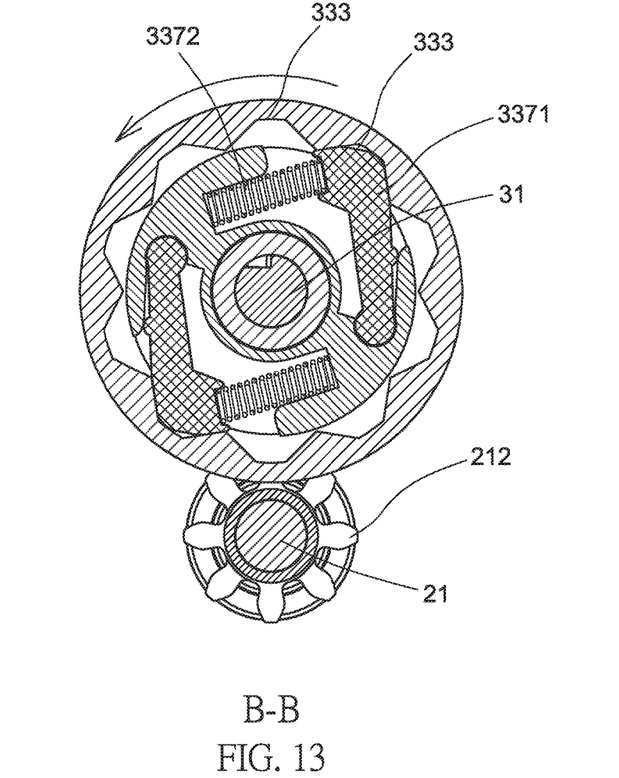
FIG. 13 is a sectional view taken along line B-B of FIG. 11.
Figure 14:
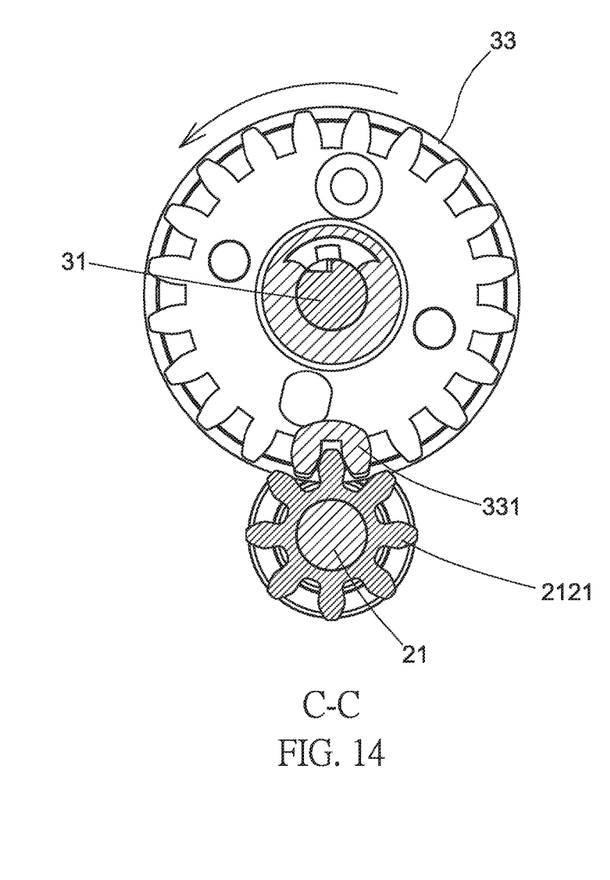
FIG. 14 is a sectional view taken along line C-C of FIG. 11.
Figure 15:
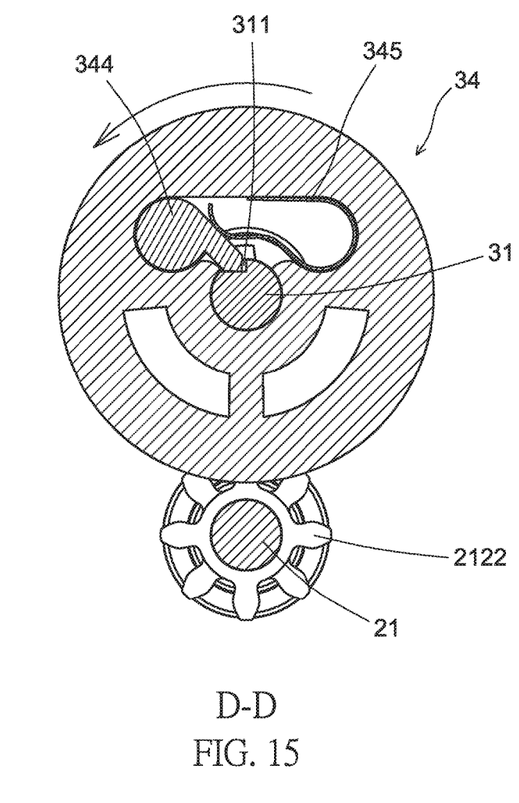
FIG. 15 is a sectional view taken along line D-D of FIG. 11.

The first number wheel 33 comprises a toothed section 331 on one surface meshed with the first teeth 2121, an internal space 332, a plurality of equally spaced troughs 333 on an edge of the space 332, a pawl 334, an elastic member 335, a ring shaped spacer 336, two spring-loaded arm assemblies 337 having an arm 3371 and a torsion spring 3372 secured to an end of the arm 3371, and a ring shaped cover 338 having a cavity 3381 on an outer surface with the bossed hole 322 disposed therein.

The cover 338 is adapted to releasably secure to the edges of the troughs 333 to conceal the pawl 334, the elastic member 335, the spacer 336, and the spring-loaded arm assemblies 337 in the space 332.

The torsion spring 3372 has an open end urging against inside of the first number wheel 33 and the arm 3371 is disposed in the trough 333. The elastic member 335 urges against the pawl 334.

Figure 1:
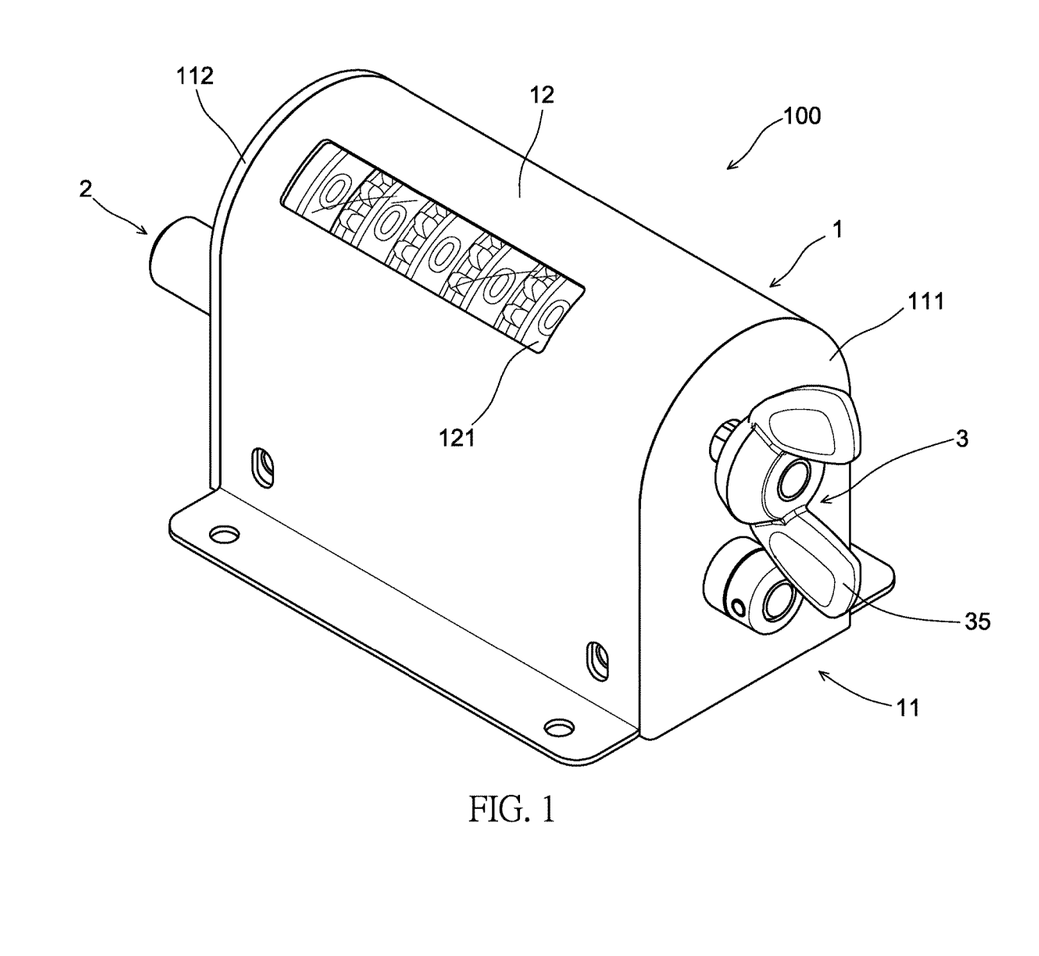
FIG. 1 is a perspective view of a device for measuring rotational speed according to the invention.
Figure 2:
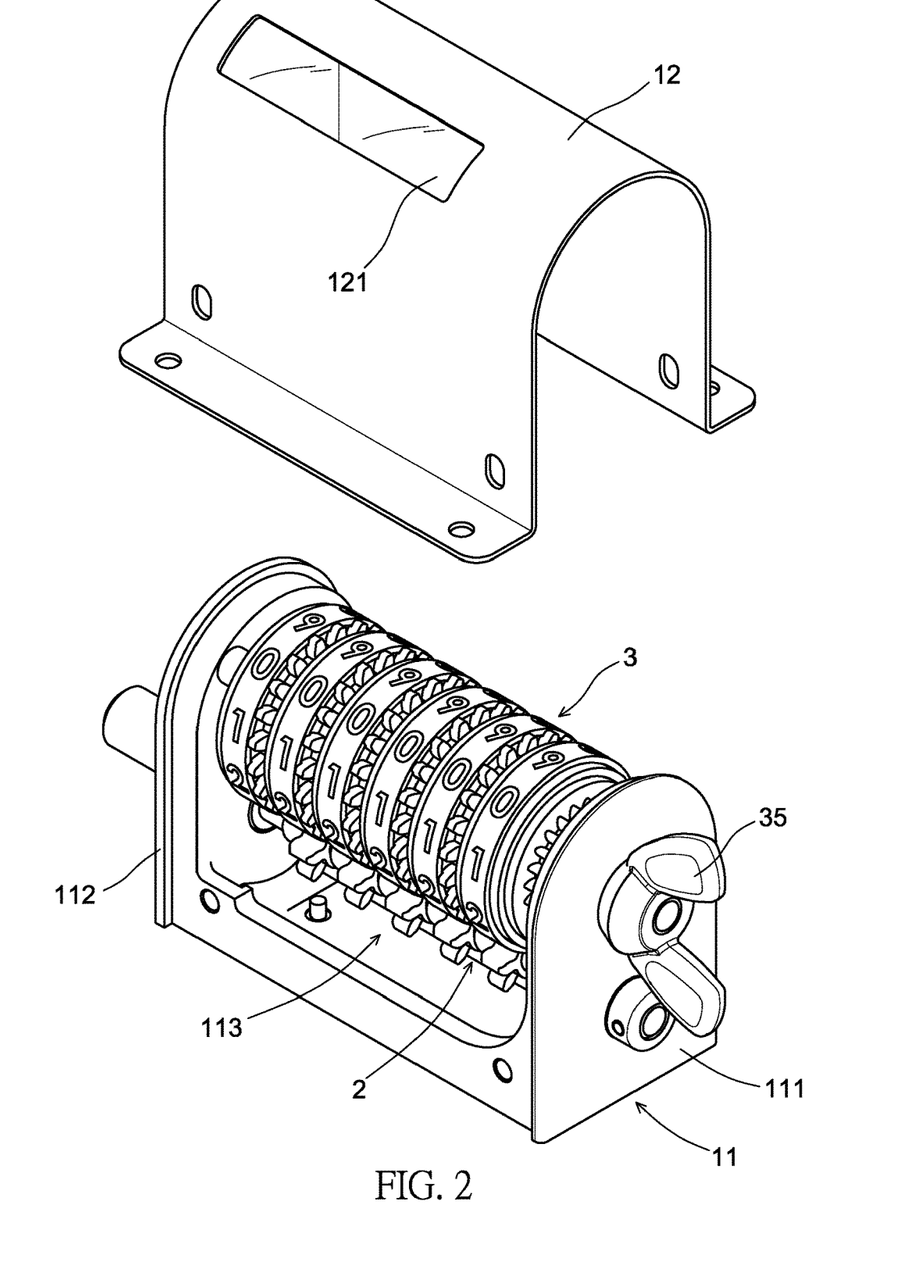
FIG. 2 is an exploded perspective view of the device with the cover detached.
Figure 3:
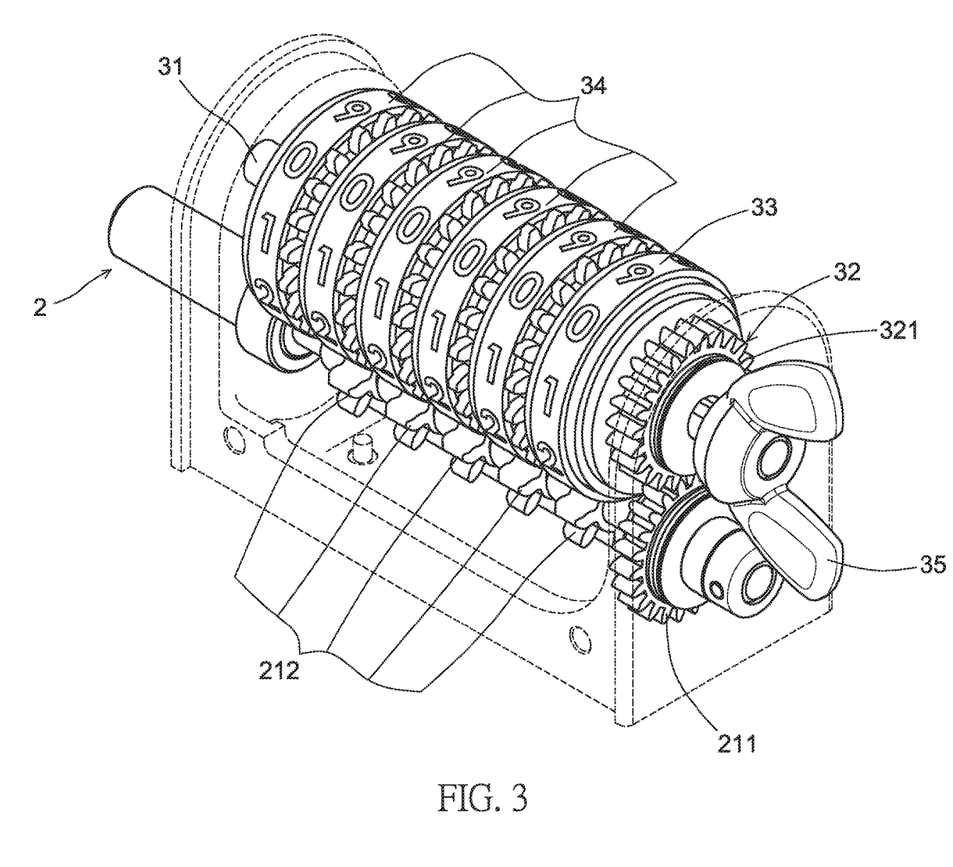
FIG. 3 is an enlarged view of the device without the cover.
Figure 4:
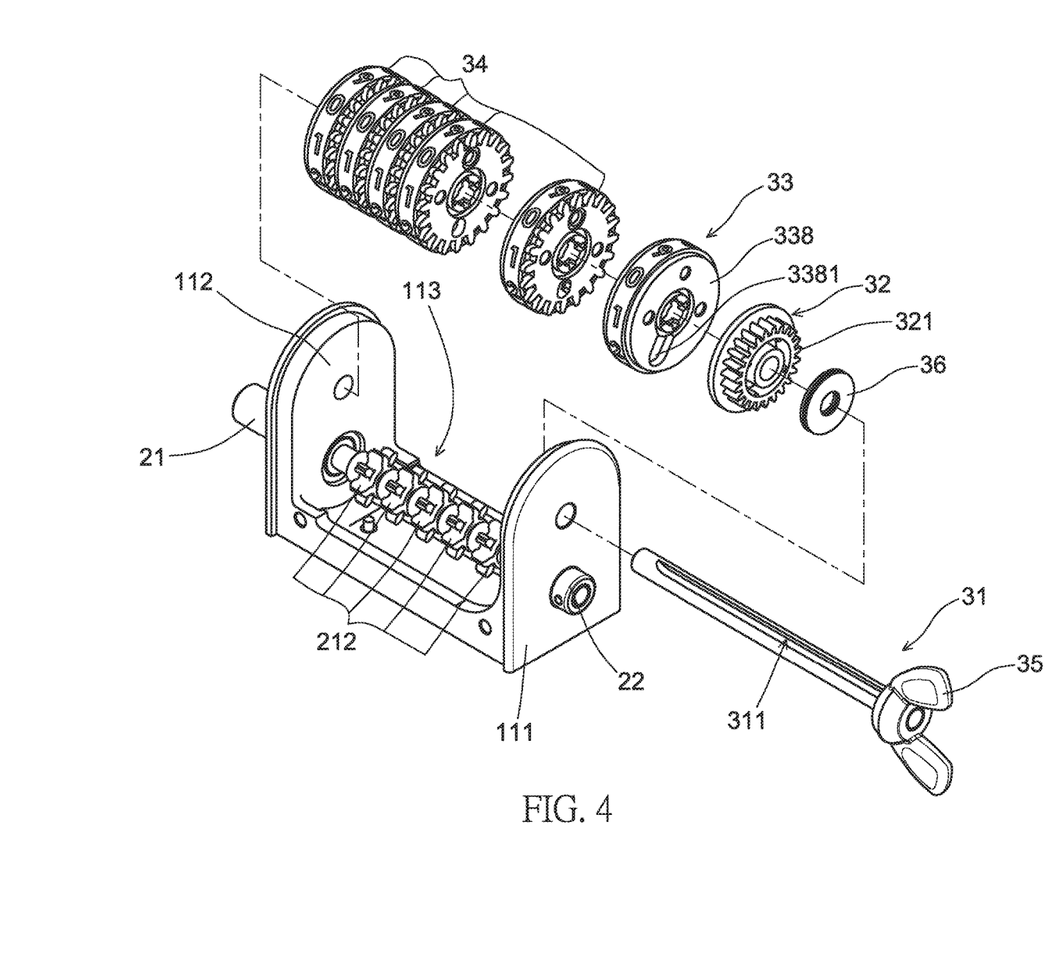
FIG. 4 is an exploded view of FIG. 3.
Figure 5:
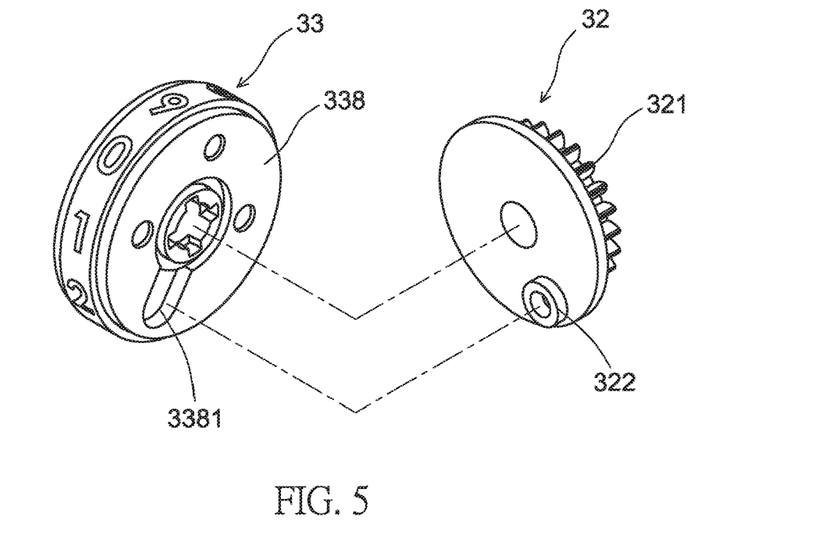
FIG. 5 is a perspective view showing the first number wheel and the gear member to be fastened together.
Figure 6:
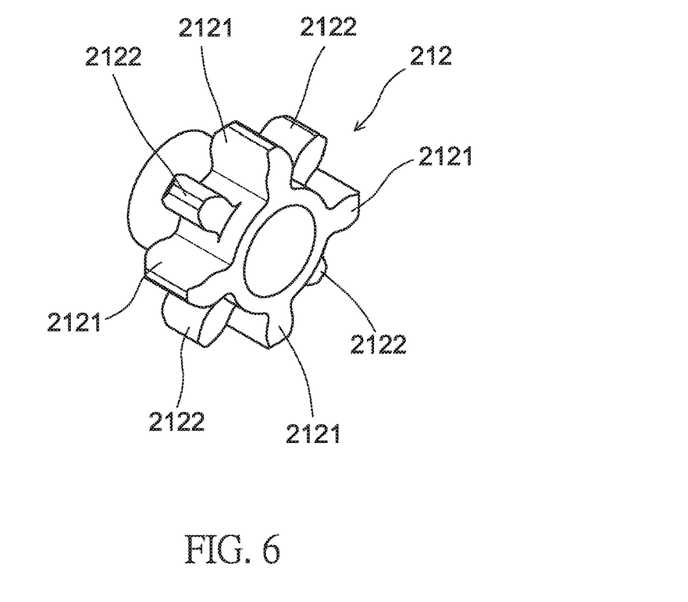
FIG. 6 is a perspective view of the gear element.
Figure 7:
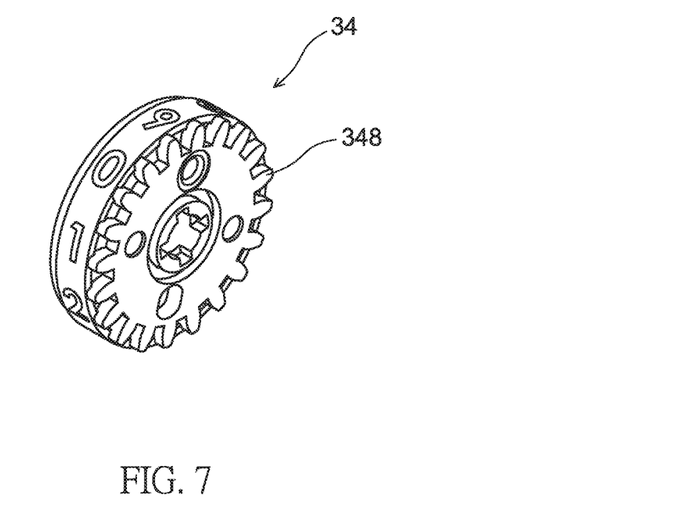
FIG. 7 is a perspective view of the second number wheel.
Figure 8:
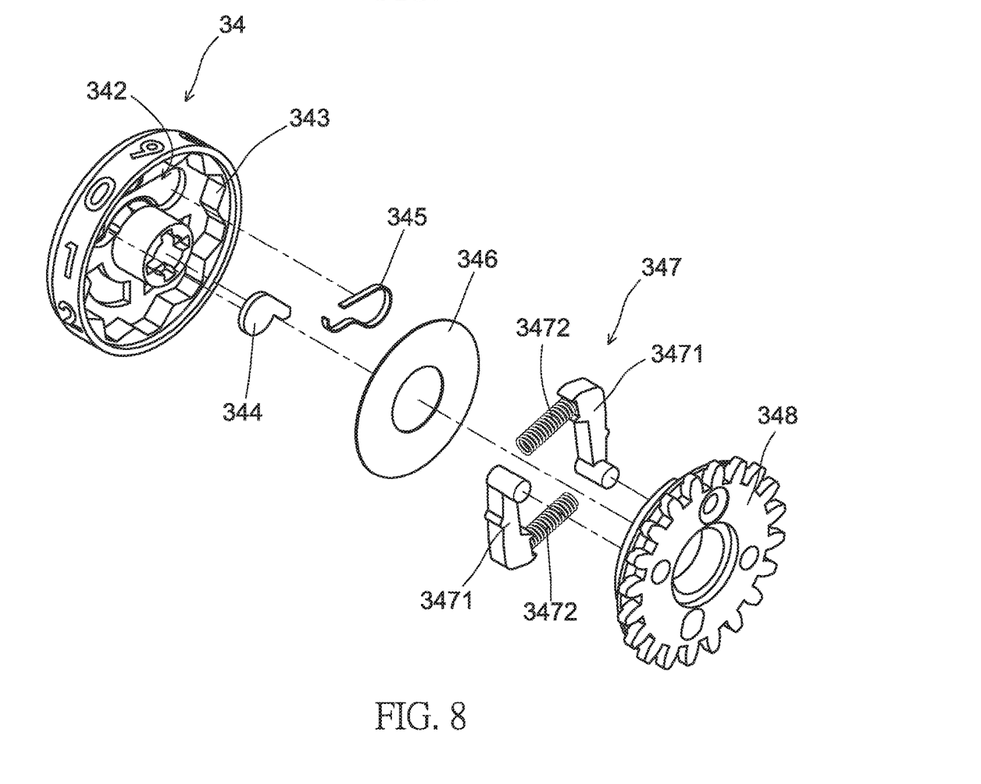
FIG. 8 is an exploded view of the second number wheel.

The second number wheel 34 comprises a toothed cover 348 on the other surface meshed with the second teeth 2122, an internal space 342, a plurality of equally spaced troughs 343 on an edge of the space 342, a pawl 344, an elastic member 345, a ring shaped spacer 346, and two spring-loaded arm assemblies 347 having an arm 3471 and a torsion spring 3472 secured to an end of the arm 3471. The toothed cover 348 is adapted to releasably secure to the edges of the troughs 343 to conceal the pawl 344, the elastic member 345, the spacer 346, and the spring-loaded arm assemblies 347 in the space 342.

The torsion spring 3472 has an open end urging against inside of the second number wheel 34 and the arm 3471 is disposed in the trough 343. The elastic member 345 urges against the pawl 344. Some digits of the second number wheels 34 can be seen through a window 121 on the cover 12. Each of the pawls 344, 334 clears the groove 311. Preferably, the troughs 333, 343 are tapered.

A rotational speed measurement of the shaft 21 is discussed below. A rotation of the shaft 21 rotates the gear member 32 at the same speed. And in turn, the cover 338 (i.e., the first number wheel 33) rotates. As such, counting begins. After the first number wheel 33 has rotated one revolution (i.e., a rotation from digit "0" to digit "9" and further to the digit "0"), the toothed section 331 rotates the first teeth 2121 of the gear element 212 one pitch. And in turn, the second teeth 2122 of the gear element 212 rotate the toothed cover 348 of an adjacent second number wheel 34 one pitch. Likewise, after the adjacent second number wheel 34 has rotated one revolution (i.e., 10 pitches), an immediately adjacent second number wheel 34 may rotate one pitch. This is a carry mechanism of the device. As a result, a rotational speed of the shaft 21 is measured.

Figure 16:
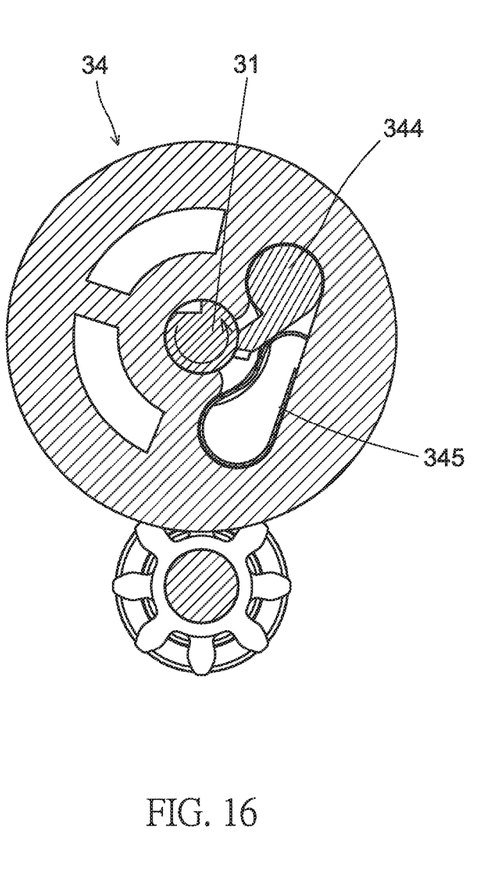
FIG. 16 is a sectional view similar to FIG. 15 showing a reset operation in an initial step.
Figure 17:
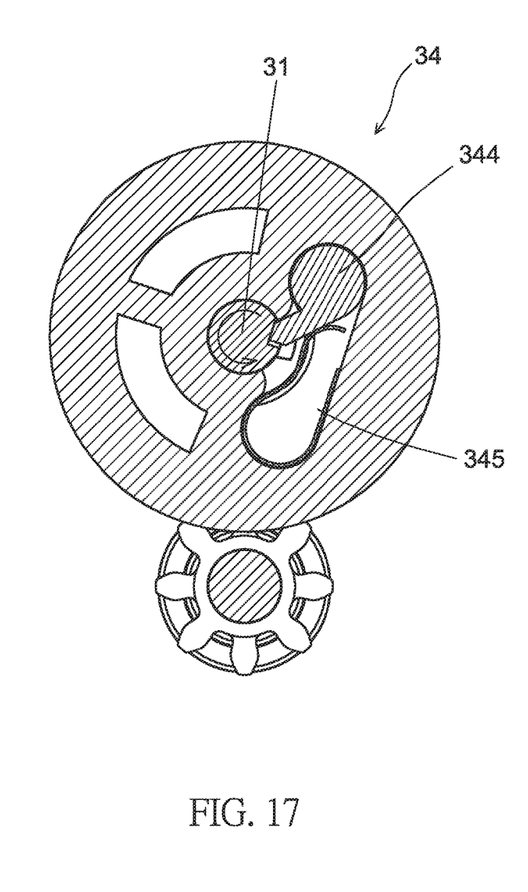
FIG. 17 is a sectional view similar to FIG. 16 showing the pawl disposed in the trough in the reset operation.

A reset operation of the device is discussed below. After the rotation of the shaft 21 has been stopped, an individual may manually counterclockwise rotate the wing handle 35 which in turns counterclockwise rotates the reset shaft 31. And in turn, finger shaped portions of the pawls 334, 344 are pushed to dispose in the groove 311 due to the expansion of the elastic members 335, 345. Thus, the first number wheel 33 and the second number wheels 34 rotate. The rotation of the wing handle 35 can be stopped when digits "0" of the second number wheels 34 can be seen through the window 121.

Figure 18:
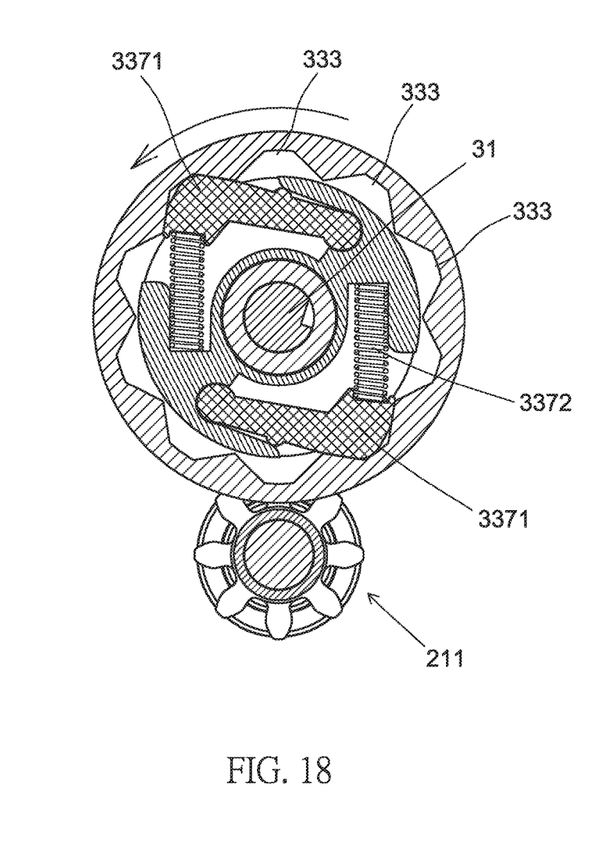
FIGS. 18 and 19 are sectional views similar to FIG. 13 together showing a bending movement of the spring-loaded arm assemblies in the reset operation.
Figure 19:
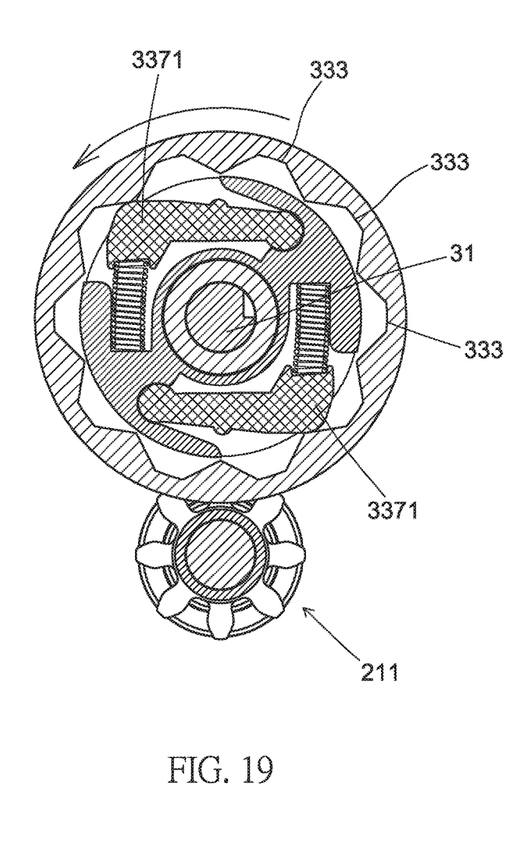

It is noted that the shaft 21 is motionless in the reset operation. Also, the gear member 32 is motionless due to engagement with the gear 211. Further, the cover 338 is motionless because the bossed hole 322 in fastened in the cavity 3381. The rotational engagement of the arms 3371, 3471 in the troughs 333 makes a click sound to alert the individual that the reset operation is going on.

While the invention has been described in terms of preferred embodiments, those skilled in the art will recognize that the invention can be practiced with modifications within the spirit and scope of the appended claims.

What is claimed is:

1. A device for measuring rotational speed, comprising:
a housing comprising a base including vertical first and second end walls, and a space member defined by a horizontal portion of the base and the first and second end walls, and a cover releasably secured onto the base and including a window;
a drive mechanism disposed through the first and second end walls and on a lower portion of the space member, the drive mechanism comprising a rotatable shaft member having one end through the second end wall, and other end through the first end wall to dispose on an outer surface of the first end wall, the shaft member including a gear adjacent to an inner surface of the first end wall, and a plurality of equally spaced gear elements between the first end wall and the gear, the gear elements being rotatable around the shaft member in a suspended manner, each gear element including a plurality of equally spaced first teeth and a plurality of equally spaced second teeth alternated with the first teeth; and
a counter assembly disposed through the first and second end walls and on an upper portion of the space member, the counter assembly comprising:
a rotatable reset shaft having one end through the second end wall, and other end through the first end wall to form a wing handle on an outer surface of the first end wall, the reset shaft including a lengthwise, elongated groove;
a gear member configured to rotate around the reset shaft in a suspended manner and meshed with the gear, the gear member including a projection wherein size and number of teeth of the gear member are the same as that of the gear; and
a first number wheel and a plurality of second number wheels arranged from the gear member to the second end wall sequentially on the reset shaft, the first and second number wheels being rotatable around the reset shaft in a suspended manner;
wherein the first number wheel includes a toothed section meshed with the first teeth, an internal first space, a plurality of equally spaced first troughs on an edge of the first space, a first pawl, a first elastic member urging against the first pawl, two spring-loaded first arms disposed in the first troughs and urging against inside of the first number wheel, and a ring shaped first cover including a first cavity with the projection disposed therein;

each second number wheel includes a toothed cover meshed with the second teeth, an internal second space, a plurality of equally spaced second troughs on an edge of the second space, a second pawl, a second elastic member urging against the second pawl, and two spring-loaded second arms disposed in the second troughs and urging against inside of the second number wheel;

the second number wheels are partially visible through the window; and each of the first and second pawls clears the lengthwise, elongated groove.

2. The device for measuring rotational speed of claim 1, wherein the first and second troughs are tapered.

3. The device for measuring rotational speed of claim 2, further comprising a sleeve on an outer surface of the first end wall with the other end of the shaft member disposed therein.

4. The device for measuring rotational speed of claim 1, further comprising a wing handle on the outer surface of the first end wall with the other end of the reset shaft secured thereto.

5. The device for measuring rotational speed of claim 1, further comprising at least one washer between the first number wheel and the first end wall.

\* \* \* \* \*